(12) United States Patent
Wu et al.

(10) Patent No.: US 9,192,894 B2
(45) Date of Patent: *Nov. 24, 2015

(54) ELECTROCHEMICAL SEPARATION MEMBRANE AND THE MANUFACTURING METHOD THEREOF

(71) Applicant: Enerage Inc., Yilan County (TW)

(72) Inventors: Mark Y. Wu, Yilan County (TW); Cheng-Yu Hsieh, Yilan County (TW); Yuan-Hsin Chang, Yilan County (TW); Jing-Ru Chen, Yilan County (TW); Shu-Ling Hsieh, Yilan County (TW)

(73) Assignee: ENERAGE INC., Yilan County (TW)

( * ) Notice: Subject to any disclaimer, the term of this patent is extended or adjusted under 35 U.S.C. 154(b) by 430 days.

This patent is subject to a terminal disclaimer.

(21) Appl. No.: 13/671,363

(22) Filed: Nov. 7, 2012

(65) Prior Publication Data

US 2013/0327704 A1    Dec. 12, 2013

(30) Foreign Application Priority Data

Jun. 11, 2012 (TW) .............................. 101120930 A (51) Int. Cl.
*B01D 69/12* (2006.01)
*B01D 69/10* (2006.01)
(Continued)

(52) U.S. Cl.
CPC ............ *B01D 69/10* (2013.01); *B01D 67/0048* (2013.01); *B01D 67/0079* (2013.01); *B01D 71/12* (2013.01); *B01D 71/16* (2013.01); *B01D 71/42* (2013.01); *B01D 71/48* (2013.01); *B01D 71/56* (2013.01); *B01D 71/64* (2013.01); *H01M 2/145* (2013.01); *H01M 2/166* (2013.01);
(Continued)

(58) Field of Classification Search
None
See application file for complete search history.

(56) References Cited

U.S. PATENT DOCUMENTS 5,952,120 A    9/1999 Yu et al.
6,207,053 B1   3/2001 Carroll et al.
(Continued)

FOREIGN PATENT DOCUMENTS

CN    101481855 A    7/2009
CN    101826606 A    9/2010

OTHER PUBLICATIONS

Panaitescu et al "Properties of composite materials from polyethylene and cellulose microfibrils", Journal of optoelectronics and advanced materials, vol. 9, No. 8, Aug. 2007, pp. 2524-2528.*

(Continued)

*Primary Examiner* — Krishnan S Menon
(74) *Attorney, Agent, or Firm* — WPAT, P.C.; Anthony King (57) ABSTRACT

An electrochemical separation membrane and the manufacturing method thereof are disclosed. The method includes: a polymer solution preparing step to mix a polymer material, solvent and ceramic precursors thoroughly to form a polymer solution, wherein the polymer material and the ceramic precursors are dissolved uniformly in the solvent; a coating step to coat the polymer solution on a porous base material; a hydrolysis step to cause the porous base material coated with the polymer solution to contact an aqueous solution to hydrolyze the ceramic precursor into ceramic particles; and a drying step to remove the water and the solvent from the porous base material and in order to form the electrochemical separation membrane. The electrochemical separation membrane made of this method have better ion conductivity, interface stability and thermal stability based on the ceramic particles.

9 Claims, 4 Drawing Sheets

(51) Int. Cl.
*B01D 71/64* (2006.01)
*B01D 71/02* (2006.01)
*B01D 71/16* (2006.01)
*B01D 71/34* (2006.01)
*B01D 67/00* (2006.01)
*B01D 71/42* (2006.01)
*B01D 71/56* (2006.01)
*B01D 71/48* (2006.01)
*B01D 71/12* (2006.01)
*H01M 2/14* (2006.01)
*H01M 2/16* (2006.01)

(52) U.S. Cl.
CPC .......... *H01M2/1653* (2013.01); *H01M 2/1686* (2013.01); *B01D 71/024* (2013.01); *B01D 71/34* (2013.01)

(56) References Cited

U.S. PATENT DOCUMENTS

| | | | |
|---|---|---|---|
| 6,322,923 | B1 | 11/2001 | Spotnitz et al. |
| 6,368,742 | B2 | 4/2002 | Fisher et al. |
| 7,087,343 | B2 | 8/2006 | Shi et al. |
| 7,959,011 | B2 | 6/2011 | Hennige et al. |
| 2008/0245735 | A1* | 10/2008 | Hennige et al. ............. 210/650 |
| 2010/0316903 | A1 | 12/2010 | Kim et al. |
| 2012/0015254 | A1 | 1/2012 | Lee et al. |
| 2012/0090758 | A1 | 4/2012 | Lee et al. |
| 2012/0094184 | A1 | 4/2012 | Abe et al. |

OTHER PUBLICATIONS

English abstract of CN 101826606A is attached to document.
English abstract of CN 101481855A is attached to document.

* cited by examiner

ELECTROCHEMICAL SEPARATION MEMBRANE AND THE MANUFACTURING METHOD THEREOF

CROSS-REFERENCE TO RELATED APPLICATION

This application claims the priority of Taiwanese patent application No. 101120930, filed on Jun. 11, 2012, which is incorporated herewith by reference

BACKGROUND OF THE INVENTION

1. Field of the Invention

The present invention relates to an electrochemical separation membrane and the manufacturing method thereof, especially to the manufacturing method using ceramics precursors to produce ceramic particles by hydrolysis for forming a ceramic-polymer composite membrane having the inorganic particles distributed uniformly in polymer material, and having low internal resistance and high stability in circle charge/discharge.

2. The Prior Arts

The traditional secondary batteries, such as the nickel-cadmium batteries and the nickel-hydride batteries, have been replaced by a secondary lithium ion battery since the latter was presented to the public due to its advantages of high energy density and long lifespan. With the technology of the battery design and materials in existence and the development of new materials, the application fields of the secondary lithium ion battery are broadened.

In the market of consumer electronics and electric vehicles, the most important evaluating item is safety; therefore, raising the safety of the safety-related materials such as the separation membrane is the key work in battery design. Therefore, the quality indexes such as strength, thickness, distribution of micro holes and thermal actuating of the separation membrane determine the factors such as the capacitance of battery, life circle and lifespan of battery and safety. Therefore, the development of the separation membrane becomes more important while the marketing is developing.

Recently, most of the secondary lithium ion batteries use porous polyolefin polymers as the separation membrane, wherein the polyolefin polymers include polypropylene (PP), polyethylene (PE) and PP/PE/PP layer-laminated. The polyolefin polymers have advantages of low-cost, good mechanical strength and good chemical stability. Manufacturing methods of the separation membrane are divided into dry and wet type methods. The processes of the dry type method are disclosed in the content of U.S. Pat. Nos. 5,952,120, 6,207,053 and 6,368,742. Those methods use polyolefin polymers, i.e. PE, PP and PP/PE/PP layer-laminated, as the main materials for manufacturing the separation membrane. For the lithium ion battery system, since the polarity of the polyolefin polymers is very low, such that the wetting effect of electrolytes to the separation membrane is not good, and the ion electric conductivity of whole lithium ion battery is lower than the ion electric conductivity of the electrolytes. In order to improve the affinity between the polyolefin polymers and electrolyte and improve the wetting effect. In some researches, the surface properties of the polyolefin polymers are modified to increase wetting effect, for example, the U.S. Pat. No. 6,322,923 disclosed covering a gelatinous polymer on the polyolefin porous membrane to enhance the wetting effect. Chinese patent publication No. 101826606A disclosed a polytetrafluoroethene lithium ion battery separation membrane and its manufacturing method, which uses a polytetrafluoroethene porous membrane as a base material, then a polymer is formed on one or two surfaces of the base material by dipping, coating or sprays coating, and finally a composite membrane is obtained after drying and thermal-pressing shaping. The battery separation membrane has the long service lifespan and safety based on its chemical stability, thermal stability and antioxidative activity.

The manufacturing method of the polyolefin separation membrane is that firstly extruding the melting materials into thin film firstly, and then stretching the thin film in a single direction or bi-direction. In the stretching process, the lamella structure of hard elastic materials, which is arranged in parallel and perpendicular to the extruding direction, are stretched to form micro holes. Finally, those micro holes are fixed by a thermal boarding process. The cost of the dry type method is low, but the ultimate price of the separation membrane is still high because the conditions of processes are strict to meet the specification of the secondary lithium ion battery. The shapes of micro holes are straight, so that short circuit may occur in the cathode end of the secondary lithium ion battery because the separation membrane is pierced by the lithium crystal. In order to solve the safety problem, manufacturing a thermal resistance layer or adding inorganic particles are generally used. For example, U.S. Pat. No. 7,087,343 describes that a polyolefin porous membrane having a low melting point is combined with a non-woven fabrics base material with a high melting point by using a swelling polymer as adhesive, wherein the non-woven fabrics base material can be further coated with a nano-oxides serving as a heat-resistance layer.

As described above, the manufacturers of the separation membrane understand the disadvantages in thermal stability of traditional separation membrane (the main material is PE) recently, and try to improve the safety in some ways, among which the technology of inorganic composite separation membrane is mostly focused. US patent publication No. 2012/0,094,184 A1 disclosed that a separation membrane with good thermal stability is formed by coating a mixture solution including polymers, dispersant and ceramic particles with different sizes on a non-woven fabric base material. US patent publication No. 2012/0,090,758 A1 disclosed smashing and dispersing the ceramic particles by ball-milling. Those prior arts described above disclosed that the polymer solution and ceramics particles not dissolved are forced to mix uniformly by using the dispersant or ball-milling. However, the mixing effect is not noticeably obvious and the particle size of the ceramic particles is hard to control in the processes.

U.S. Pat. No. 7,959,011 disclosed that a composite layer is made of a PET non-woven fabric mixed with ceramic particles. The ceramic particles are added directly or formed after hydrolyzing the metal alkoxide. Since an inorganic layer is formed between the metal oxide and PET after continuous dipping, drying and sintering, such that the separation membrane has higher thermal stability and deform resistance under heating, and does not shrink and melt under 200° C. Therefore, the safety of the power batteries is improved. However, the cohesive strength between the composite layer and base material membrane is not good enough, and the stability of separation membrane is also not good.

Chinese patent publication No. 101481855A disclosed a manufacturing method of $SiO_2$/polyvinylidene nano-composite fabric membrane, in which sol-gel principle is applied to change the properties of the nano $SiO_2$ particles, co-mix with the nano $SiO_2$ particle and the polyvinylidene, and finally manufacture the nano-composite fabric membrane with the electrospinning technology.

US patent publication No. 2010/0,316,903 A1 also describes manufacturing method of separation membrane, in which slurry including adhesive and ceramic particles is coated on a surface of a porous base material firstly, wherein the adhesive is a cross-linking polymer, such that the adhesive and the porous base material are cross-linked after slurry coating and the adhesion strength between the adhesive and the base material is enhanced. US patent publication No. 2012/0,015,254 A1 enhances the adhesion strength by other method, in which slurry including adhesive and ceramic particles with dielectric coefficient higher than 5 is coated on a porous base material firstly, and then a polymer solution is coated on the outside by the electrochemical method to form a second coating layer for covering the base material and enhancing the stability of the separation membrane.

Most of the prior arts coat slurry having ceramic particles on the two sides of the separation membrane to form protective layers. The technology has problems of low adhesive strength and non-uniform distribution of ceramic particles, and the performance of the separation membrane is affected. Some researches use polymer second cross-linking or covering to improve the adhesive strength by electrochemical coating. However, those methods make the process difficult and complicated. Some researches prepare the ceramic particles by sol-gel method, and the present invention prepares the polymer solution distributing uniformly by using the sol-gel characteristics of the metal alkoxide which serve as the precursors, such that the ceramic particles are produced by hydrolysis after coating to form the membrane, and the final product is a ceramic-polymer composite membrane with micro-holes, which has enough adhesive strength and the ceramic particles therein are distributed uniformly.

As described, most of prior arts add the ceramic particles directly which are coated on two sides of the membrane to form protective layers, and the accuracy of membrane thickness and the distribution of ceramic particles are hard to control. Therefore, an objective of the present invention to provide a manufacturing method of a ceramic-polymer composite membrane with simple processes so as to improve the disadvantages encountered in the prior arts.

SUMMARY OF THE INVENTION

An objective of the present invention is to provide a solution to solve the disadvantages encountered in the prior arts, and an electrochemical separation membrane and the manufacturing method thereof. The electrochemical separation membrane includes a porous base material, a gelatinous polymer coated on at least one surface of the porous base material and a plurality of ceramic particles distributed uniformly in the gelatinous polymer, wherein the porosity of the porous base material is higher than 30%, and the particle size of ceramic particles ranges 0.01 to 5 μm.

The manufacturing method of the electrochemical separation membrane of the present invention includes: a polymer solution preparing step to mix a polymer material, solvent and ceramic precursors thoroughly, such that the polymer and the ceramic precursors are dissolved uniformly in the solvent to form a polymer solution; a coating step to coat the polymer solution on a porous base material; a hydrolysis step to make the porous base material coated with the polymer solution contact an aqueous solution, such that the ceramic precursors are hydrolyzed into ceramic particles; and a drying step to remove the water and the solvent from the porous base material completely upon hydrolyzing to form a complete electrochemical separation membrane.

The technical feature of present invention is to mix and disperse the ceramic precursors and the polymer material uniformly during preparing the polymer solution, such that the ceramic particles are distributed uniformly in the electrochemical separation membrane. Since the existence of the ceramic particles, the ion conductivity, the interface stability of the electrochemical device is increased, and the thermal stability is also improved under the high temperature.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

The accompanying drawings are included to provide a further understanding of the present invention, and are incorporated in and constitute a part of this specification. The drawings illustrate embodiments of the present invention and, together with the description, serve to explain the principles of the present invention.

Figure 1:
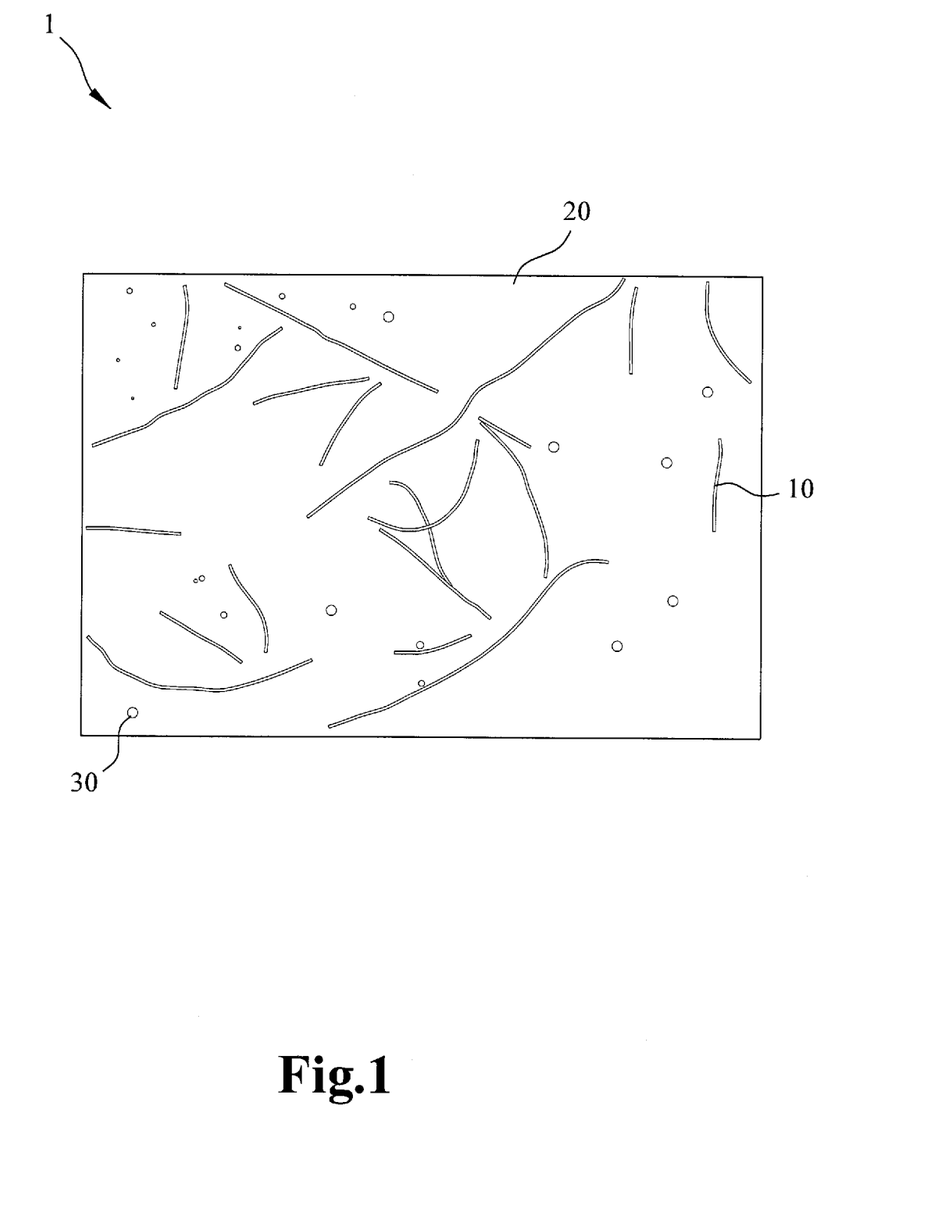
FIG. 1 is a conceptual diagram of the microstructure of the electrochemical separation membrane of the present invention.

FIG. 1 shows a conceptual diagram of the microstructure of the electrochemical separation membrane of the present invention. As shown in FIG. 1, the electrochemical separation membrane 1 of the present invention includes a porous base material 10, a gelatinous polymer 20 coated on at least one surface of the porous base material 10 and a plurality of ceramic particles 30 distributed uniformly in the gelatinous polymer 20, wherein the porosity of the porous base material 10 is higher than 30%, the particle size of ceramic particles ranges 0.01 to 5 μm, and the thickness of the electrochemical separation membrane 1 ranges 10~60 μm.

The gelatinous polymer 20 is selected from the group consisting of at least one of polyvinylidene fluoride, polyurethane, polyethylene oxide, polypropylene oxide, polyacrylonitrile, polyacrylamide, polymethyl acrylate, polymethyl methacrylate, polyvinylacetate, polyvinylpyrroidone, polytetraethylene glycol diacrylate, and polyimide.

The ceramic particles 30 are metal oxide. The metal is selected from the group consisting of at least one of Si, Ti, Al, Zr, Y, Co, Ni, Ga, Ge, and rare-earth metals. The porous base material 10 is a polyolenfine cellulose material, such as polyethylene cellulose, polypropylene cellulose, polybutylene cellulose, polypentane cellulose, and polyethylene terephthalate cellulose, and the porosity of the porous base material 10 is higher than 30%.

Figure 2:
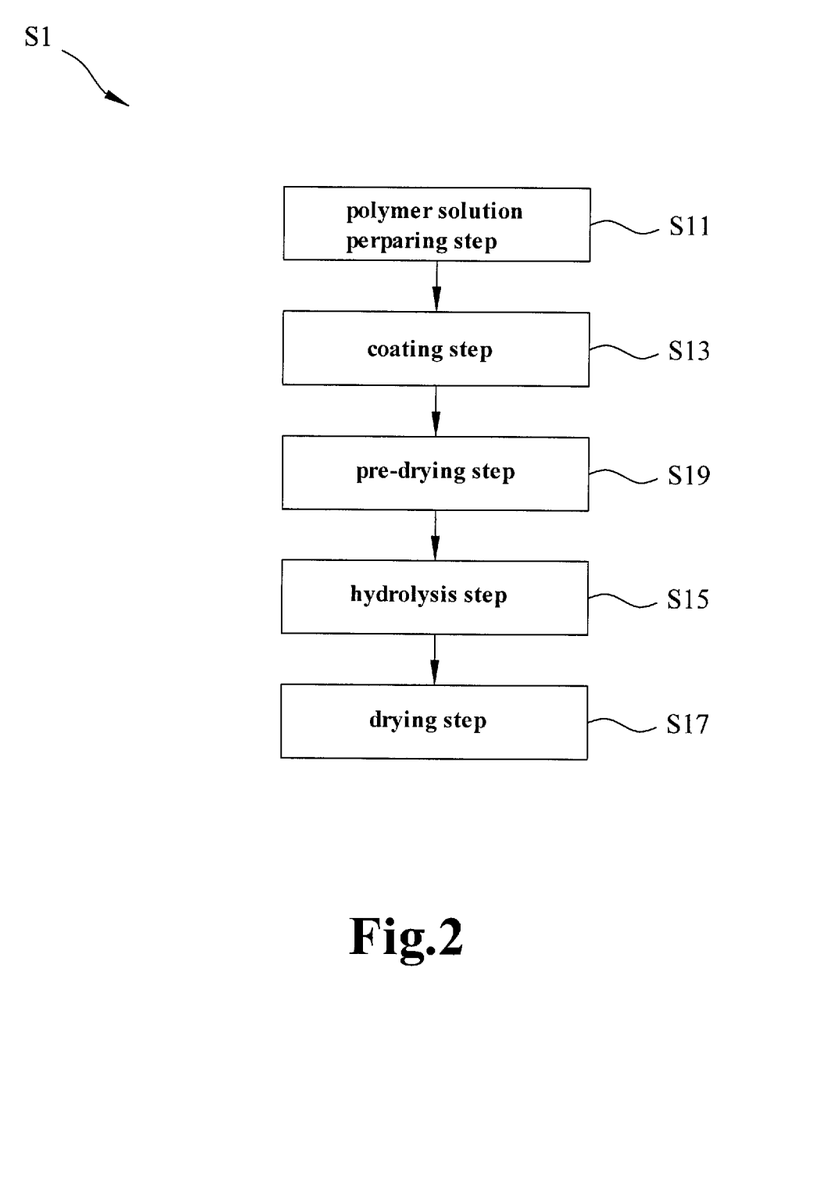
FIG. 2 is a flow chart of the manufacturing method of an electrochemical separation membrane of the present invention.

FIG. 2 shows a flow chart of the manufacturing method of an electrochemical separation membrane of the present invention. As shown in FIG. 2, the manufacturing method S1 of an electrochemical separation membrane of the present invention includes a polymer solution preparing step S11, a coating step S13, a hydrolysis step S15 and a drying step S17.

The polymer solution preparing step S11 is to mix at least one polymer material, at least one solvent and at least one ceramic precursor thoroughly, such that the polymer material and the ceramic precursor dissolve uniformly in the solvent and forms a polymer solution. The polymer material becomes a polymer gel due to cross-linking with the electrolyte, wherein the polymer gel has the coherence property of solid state and the diffusion and transportation properties of liquid state, such that the electrolyte is limited in a polymer network, and the ions not only move free in the continuous micro holes but also transport through the movement of the polymer main chain. Therefore, the ion conductivity of the separation membrane is improved and the performance of the electrochemical device is further improved.

The polymer material is selected from the group consisting of at least one of polyvinylidene fluoride, polyurethane, polyethylene oxide, polypropylene oxide, polyacrylonitrile, polyacrylamide, polymethyl acrylate, polymethyl methacrylate, polyvinylacetate, polyvinylpyrroidone, polytetraethylene glycol diacrylate, and polyimide.

The solvent is selected from the group consisting of at least one of acetone, butanone, N-methylpyrrolidone, tetrahydrofuran, dimethylformamide, dimethylacetamide, and tetramethylurea. The different solvents are selected according to the feature of the electrochemical separation membrane; for example, acetone and butanone with high vaporization and low boiling points are preferred for forming the porous polymer membrane by phase separation due to heat removing when the solvent is vaporized.

The ceramic precursor is a metal alkoxide or a metal inorganic salt, which is dissolved in the solvent, the formula of the metal alkoxide is $M_x(OR)_y(R')_z$, wherein the M represents a metal element, R is a carbon chain functional group, R' is another carbon chain functional group, $1 \leq x \leq 6$, $1 \leq y \leq 20$, $0 \leq z \leq 20$, and M is selected from the group consisting of at least one of Si, Ti, Al, Zr, Y, Co, Ni, Ga, Ge, and rare-earth metals. The real examples of metal alkoxide are tetraethyl orthosilicate (TEOS), titanium (IV)$_n$-butoxide, Zirconium (IV) ethoxide, aluminum ethoxide, $Zr(NO_3)_4 \cdot 5H_2O$.

The coating step S13 is to coat the polymer solution on a porous base material, which is a supporting backbone for providing enough mechanic strength to the separation membrane, and maintaining the porosity and thermal stability of separation membrane. The porous base material requires a certain degree of porosity and thermal stability. The coating method may include spray coating, knife coating and dipping.

The hydrolysis step S15 is to make the porous base material coated with the polymer solution contact the water or aqueous solution, such that the ceramic precursors are hydrolyzed into ceramic particles. In the present invention, the ceramic particles are formed by hydrolyzing the metal salts. To be more specific, the metal alkoxides or the metal inorganic salts are dissolved in the solvent first of all, and the metal alkoxides or the metal inorganic salts is hydrolyzed or alcoholyzed in the solvent and condensing and clustering to form a sols. Finally the metal alkoxides or metal inorganic salts are hydrolyzed completely when the sols further contacts the aqueous solution and the metal oxide particles, i.e. ceramic particles, are deposited. The formula of the full reaction is $M(OR)_a(R')_b + H_2O \rightarrow MO_x + a\,ROH + z\,R'OH$, wherein $MO_x$ is metal oxide. In addition, the particle size of the ceramic particles ranges 0.01~30 μm, and the weight percentage is 0.1~50 wt % of the polymer base material. The rate of hydrolysis depends on the types of the metal alkoxides or the metal inorganic salts, and the particle size of the ceramic particles produced by hydrolysis is controlled by controlling the rate of hydrolysis, so that acid, alkaline or catalyst is added during the polymer solution preparing step S11 and/or the hydrolysis step S15 to control the rate of hydrolysis for adjusting the particle size of the ceramic particles.

In addition, a pre-drying step S19 is further performed between the coating step S13 and the hydrolysis step S15. The pre-drying step S19 is to dry the porous base material coated with the polymer solution primarily and to cause the solvent to vaporize thoroughly, and a membrane predecessor is thus obtained.

If the solvent with low vaporization and high boiling points, such as N-methylpyrrolidone and dimethylformamide, is selected, the membrane predecessor can further contact a non-solvent in which the polymer material is not dissolved. According the differences among the solvent, non-solvent and the polymer material, the polymer chains are removed when the non-solvent is removed from the polymer solution, and nucleation and growth begin at the boundary of a polymer-lack phase region until the concentration of polymer material at the boundary is high enough to solidify and cause the polymer material of solid-state to precipitate. The existence of non-solvent in the polymer solution can reduce the stability of the polymer solution and increase the porosity while phase separating. The non-solvent is selected from the group consisting of at least one of water, glycerol and alcohols, and the weight percentage is less than 1 wt % of the polymer material.

The drying step S17 is to remove the water and solvent from the porous base material and solvent completely upon finishing hydrolysis step S15 to form a complete electrochemical separation membrane. The electrochemical separation membrane is a porous ceramic-polymer composite membrane coated with gelatinous polymer material on at least one surface, wherein at least one kind of ceramic particle is disturbed in the gelatinous polymer material and weight percentage of ceramic particles ranges 0.1~50 wt % in the polymer material.

The following will describe four experimental examples to illustrate the structure and manufacturing of the electrochemical separation membrane and those experimental examples are only used to the preferred embodiments, but not to limit the scope of the present invention.

EXPERIMENTAL EXAMPLE 1

Experimental Example 1 describes manufacturing the ceramic particles by hydrolysis, wherein the ceramic particles and a polymer material are formed as a continuous phase and fill into the micro holes of a fabric support backbone structure. Takes polyvinylidene fluoride 6 wt % to dissolve in acetone with purity 99% firstly, maintains 4 hours at 60° C., and then add tetraethyl orthosilicate 2.5% and 5%, and 1 ml ammonia 28% serving as the catalyst to form the polymer solution after lowering the temperature to the room temperature. Stir 20 minutes to 1 hour to cause the polymer solution as slurry. Then coat the polymer solution dissolved and stringed uniformly on polyethylene or polypropylene fabric base material, and then a membrane predecessor is formed after the acetone vaporizes naturally. Put the membrane predecessor into super pure water 10 second to 1 minute to hydrolyze. A porous ceramic-polymer composite membrane which can be used to an electrochemical separation membrane is obtained after drying, wherein the porous ceramic-polymer composite membrane has a thickness ranging 30~40 μm.

Figure 3:
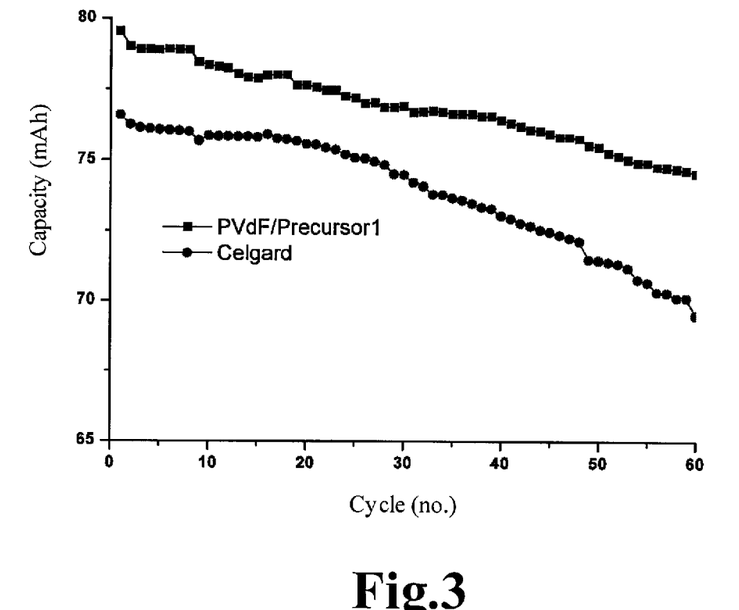
FIG. 3 is a diagram illustrating the comparing results of the cycle electrical properties at 5 C charge/discharge rate of the battery using the electrochemical separation membrane made from Experimental Example 1 of the present invention and the battery using commercial Celgard separation membrane.

Compare the cycle electrical properties of the battery using the electrochemical separation membrane made from Experimental Example 1 of the present invention and the battery using commercial Celgard separation membrane at 5 C charge/discharge rate and the comparing result is shown as FIG. 3. The result shows that the battery using the electrochemical separation membrane, made from Experimental Example 1, has better capacitance and cycle charge/discharge stability. Moreover, the thermal shrinking at 150° C. of electrochemical separation membrane, made from Experimental Example 1, is less than 5%, and the thermal shrinking at 150° C. of Celgard separation membrane is 37%. Therefore, the electrochemical separation membrane, made from Experimental Example 1, has improved greatly in thermal shrinking.

EXPERIMENTAL EXAMPLE 2

Experimental Example 2 describes manufacturing the ceramic particles by hydrolysis, wherein the ceramic particles and a polymer material are formed as a continuous phase and fill into the micro holes of a fabric support backbone structure. Take polyvinylidene fluoride 6 wt % and polyethylene cellulose 0.5% to dissolve in acetone 90 wt % and pure water 3.5% firstly, maintains it for 4 hours at 60° C., then add tetraethyl orthosilicate 2.5% and 5%, and 1 ml ammonia 28% serving as the catalyst to form the polymer solution after lowering the temperature to the room temperature, and stir for 20 minutes to 1 hour to cause the polymer solution as slurry. Then, coats the polymer solution dissolved and stringed uniformly on polyethylene or polypropylene fabric base material, and then a membrane predecessor is formed after the acetone vaporizes naturally. Put the membrane predecessor into super pure water 10 second to 1 minute to hydrolyze. A porous ceramic-polymer composite membrane which can be used to an electrochemical separation membrane is obtained after drying, wherein the porous ceramic-polymer composite membrane has a thickness ranging 30~40 μm.

Figure 4:
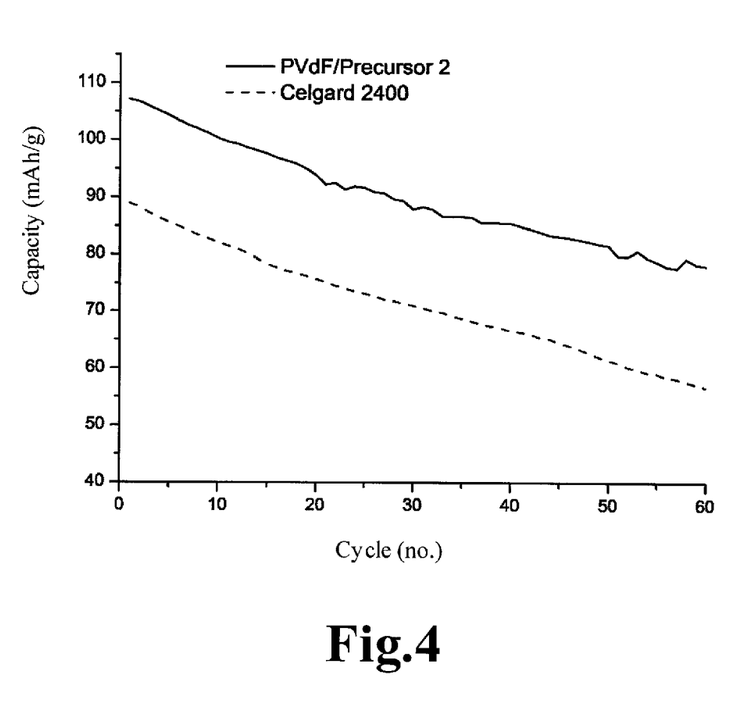
FIG. 4 is a diagram showing the comparing results of the cycle electrical properties at 5 C charge/discharge rate at 55° C. of the battery using the electrochemical separation membrane made from Experimental Example 2 of the present invention and the battery using commercial Celgard separation membrane.

Compare the cycle electrical properties at 5 C charge/discharge rate of the battery using the electrochemical separation membrane made from Experimental Example 2 of the present invention and the battery using commercial Celgard separation membrane at 55° C., and the comparing result is shown as FIG. 4. The result shows that the battery using the electrochemical separation membrane, made from Experimental Example 2, has better capacitance and cycle charge/discharge stability.

EXPERIMENTAL EXAMPLE 3

The method and steps of Experimental Example 3 is similar to Experimental Example 2, the only difference is to coat the polymer solution dissolved and stringed uniformly on polyethylene or polypropylene porous membrane base material, and then a membrane predecessor is obtained after the acetone vaporizes naturally. Put the membrane predecessor into super pure water 10 second to 1 minute to hydrolyze. A porous ceramic-polymer composite membrane which can be used to an electrochemical separation membrane is obtained after drying, wherein the porous ceramic-polymer composite membrane has a thickness ranging 30~40 μm.

Figure 5:
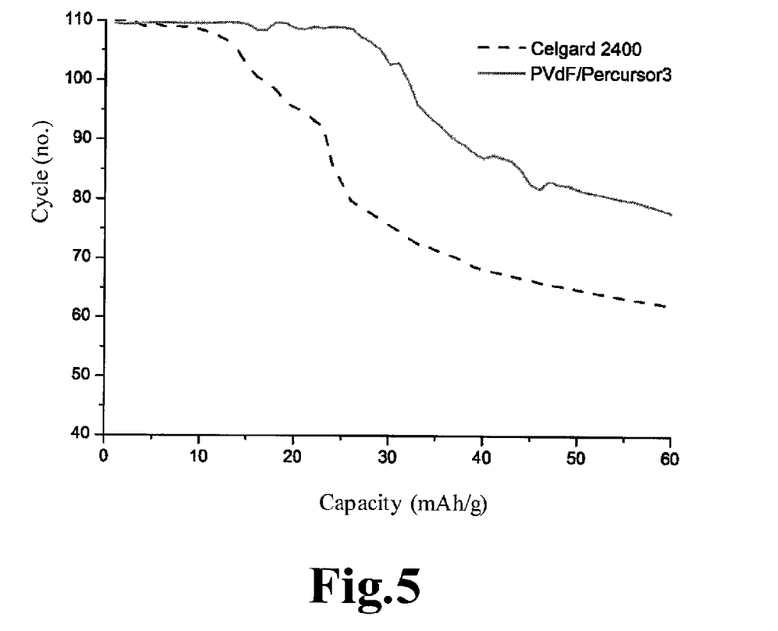
FIG. 5 is the diagram showing the comparing results of the cycle electrical properties at 5 C charge/discharge rate at 55° C. of the battery using the electrochemical separation membrane made from Experimental Example 3 of the present invention and the battery using commercial Celgard separation membrane.

Compare the cycle electrical properties at 5 C charge/discharge rate of the battery using the electrochemical separation membrane made from Experimental Example 3 of the present invention and the battery using commercial Celgard separation membrane at 55° C., and the comparing result is shown as FIG. 5. The result shows that the battery used the electrochemical separation membrane made from Experimental Example 3, has better capacitance and cycle charge/discharge stability.

EXPERIMENTAL EXAMPLE 4

Experimental Example 4 describes manufacturing the ceramic particles by hydrolysis, wherein the ceramic particles and a polymer material are formed as a continuous phase and fill into the micro holes of a fabric support backbone structure. Take polyvinylidene fluoride 6 wt % to dissolve in acetone with purity 99% firstly, maintain it for 4 hours at 60° C., then add titanium $(IV)_n$-butoxide 2.5% and 5% after lowering the temperature to the room temperature and stir for 4 hours continuously to form the polymer solution like slurry. Coat the polymer solution dissolved and stringed uniformly on polyethylene or polypropylene fabric base material, and then a membrane predecessor is obtained after the acetone vaporizes naturally. Put the membrane predecessor into super pure water 10 second to 1 minute to hydrolyze, such that $TiO_2$ particles are precipitated on the surface. A porous ceramic-polymer composite membrane which can be used to an electrochemical separation membrane is obtained after drying, wherein the porous ceramic-polymer composite membrane has a thickness ranging 30~40 μm.

Figure 6:
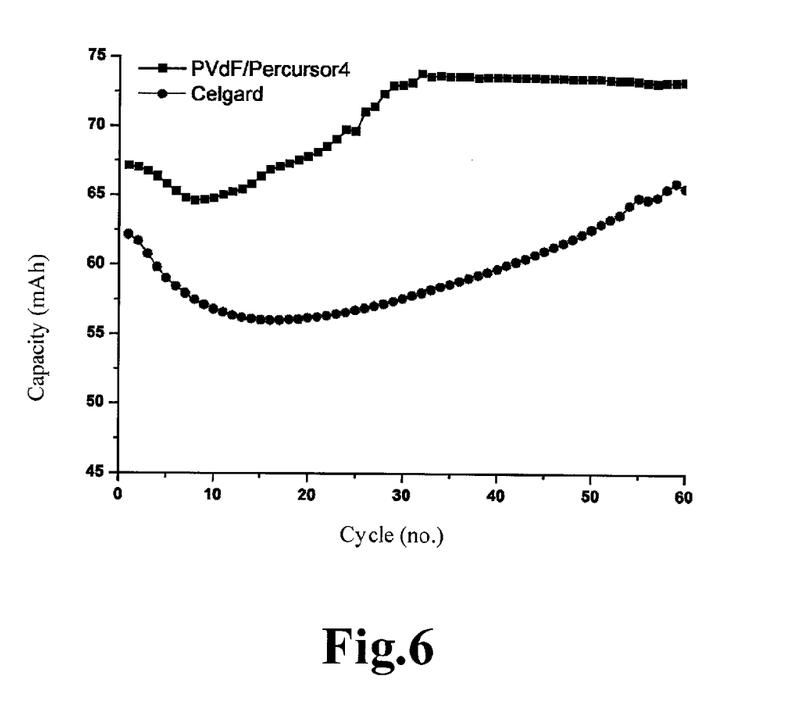
FIG. 6 is the diagram showing the comparing results of the cycle electrical properties at 5 C charge/discharge rate of the battery using the electrochemical separation membrane made from Experimental Example 4 of the present invention and the battery using commercial Celgard separation membrane.

Compare the cycle electrical properties at 5 C charge/discharge rate of the battery using the electrochemical separation membrane made from Experimental Example 4 of the present invention and the battery using commercial Celgard separation membrane, and the comparing result is shown as FIG. 6. The result shows that the battery using the electrochemical separation membrane, made from Experimental Example 4, has better capacitance and cycle charge/discharge stability.

EXPERIMENTAL EXAMPLE 5

Experimental Example 5 describes manufacturing the ceramic particles by hydrolysis, wherein the ceramic particles and a polymer material are formed as a continuous phase and fill into the micro holes of a fabric support backbone structure. Take polyvinylidene fluoride 6 wt % to dissolve in acetone with purity 99% firstly, maintains it for 4 hours at 60° C., then add zirconium (IV) ethoxide 2.5% and 5%, and 1 ml ammonia 28% serving as the catalyst to form the polymer solution after lowering the temperature to the room temperature, and stir for 20 minutes to 1 hour to cause the polymer solution as slurry. Then, coat the polymer solution dissolved and stringed uniformly on polyethylene or polypropylene fabric base material, and then a membrane predecessor is thus obtained after the acetone vaporizes naturally. Put the membrane predecessor into super pure water 10 second to 1 minute to hydrolyze. A porous ceramic-polymer composite membrane, which can be used to an electrochemical separation membrane, is obtained after drying, wherein the porous ceramic-polymer composite membrane has a thickness ranging 30~40 μm.

EXPERIMENTAL EXAMPLE 6

Experimental Example 6 describes manufacturing the ceramic particles by hydrolysis, wherein the ceramic particles and a polymer material are formed as a continuous phase and fill into the micro holes of a fabric support backbone structure. Take polyvinylidene fluoride 6 wt % to dissolve in acetone with purity 99% firstly, maintains it for 4 hours at 60° C., then add aluminum ethoxide 2.5% and 5% to form the polymer solution after lowering the temperature to the room temperature, and stir for 20 minutes to 1 hour to make the polymer solution as slurry. Coat the polymer solution dissolved and stringed uniformly on polyethylene or polypropylene fabric base material, and then a membrane predecessor is formed after the acetone vaporizes naturally. Put the membrane predecessor into super pure water 10 sec. to 1 min. to hydrolyze. A porous ceramic-polymer composite membrane, which can be used to an electrochemical separation membrane, is obtained after drying, wherein the porous ceramic-polymer composite membrane ranging a thickness of 30~40 μm.

EXPERIMENTAL EXAMPLE 7

Experimental Example 7 describes manufacturing the ceramic particles by hydrolysis, wherein the ceramic particles and a polymer material are formed as a continuous phase and fill into the micro holes of a fabric support backbone structure. Take polyvinylidene fluoride 6 wt % to dissolve in acetone with purity 99% firstly, maintain it for 4 hours at 60° C., then add $Zr(NO_3)_4 \cdot 5H_2O$ 2.5% and 5%, and 1 ml ammonia 28% serving as the catalyst to form the polymer solution after lowering the temperature to the room temperature, and stir for 20 minutes to 1 hour to make the polymer solution as slurry. Coat the polymer solution dissolved and stringed uniformly on polyethylene or polypropylene fabric base material, and then a membrane predecessor is thus obtained after the acetone vaporizes naturally. Put the membrane predecessor into super pure water 10 second to 1 minute to hydrolyze. A porous ceramic-polymer composite membrane, which can be used to an electrochemical separation membrane, is obtained after drying, wherein the porous ceramic-polymer composite membrane ranging a thickness of 30~40 μm.

The technical feature of present invention is to mix and disperse the ceramic precursors and the polymer material uniformly during preparing the polymer solution, such that the ceramic particles can be distributed uniformly in the electrochemical separation membrane. Since the existence of the ceramic particles, the ion conductivity, the interface stability of the electrochemical device is increased, and the thermal stability is also improved under the high temperature.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A manufacturing method of an electrochemical separation membrane, comprising:
    a polymer solution preparing step: mixing at least one polymer material, at least one solvent, and at least one ceramic precursor thoroughly to form a polymer solution, wherein the at least one polymer material and the at least one ceramic precursor are dissolved in the at least one solvent uniformly;
    a coating step: coating the polymer solution on a porous base material;
    a hydrolysis step: causing the porous base material coated with the polymer solution contact an aqueous solution to the hydrolyze the at least one ceramic precursor into ceramic particles; and
    a drying step: removing water and the at least one solvent from the porous base material and the polymer solution in order to form the electrochemical separation membrane,
    wherein the electrochemical separation membrane is a porous ceramic-polymer composite membrane.

2. The manufacturing method of the electrochemical separation membrane according to claim 1, wherein the at least one polymer material is selected from the group consisting of at least one of polyvinylidene fluoride, polyurethane, polyethylene oxide, polypropylene oxide, polyacrylonitrile, polyacrylamide, polymethyl acrylate, polymethyl methacrylate, polyvinylacetate, polyvinylpyrroidone, polytetraethylene glycol diacrylate, and polyimide.

3. The manufacturing method of the electrochemical separation membrane according to claim 1, wherein the at least one solvent is selected from the group consisting of at least one of acetone, butanone, N-methylpyrrolidone, tetrahydrofuran, dimethylformamide, dimethylacetamide, and tetramethylurea.

4. The manufacturing method of the electrochemical separation membrane according to claim 1, wherein a non-solvent is further added in the polymer solution, wherein the at least one polymer material is not dissolved in the non-solvent, and the non-solvent is selected from at least one of water, glycerol and alcohols, and has a weight percentage ranging less than 1 wt % of the polymer material.

5. The manufacturing method of the electrochemical separation membrane according to claim 1, wherein the at least one ceramic precursor is a metal alkoxide or a metal inorganic salt dissolved in the solvent, and formula of the metal alkoxide is $M_x(OR)_y(R')_z$, wherein the M represents a metal element, R is a carbon chain functional group, R' is another carbon chain functional group, $1 \leq x \leq 6$, $1 \leq y \leq 20$, $0 \leq z \leq 20$.

6. The manufacturing method of the electrochemical separation membrane according to claim 5, wherein the metal element is selected from the group consisting of at least one of Si, Ti, Al, Zr, Y, Co, Ni, Ga, Ge, and rare-earth metals.

7. The manufacturing method of the electrochemical separation membrane according to claim 1, wherein the porous base material is selected from the group consisting of at least one of as polyethylene cellulose, polypropylene cellulose, polybutylene cellulose, polypentane cellulose, and polyethylene terephthalate cellulose, and the he porosity of the porous base material 10 is higher than 30%.

8. The manufacturing method of the electrochemical separation membrane according to claim 1, wherein the coating method in the coating step is at least one of spray coating, knife coating, and dipping.

9. The manufacturing method of the electrochemical separation membrane according to claim 1, wherein the ceramic particles are in a range of 0.1~50 wt % of the polymer base material.

* * * * *